(12) United States Patent
Liu et al.

(10) Patent No.: US 10,103,949 B2
(45) Date of Patent: Oct. 16, 2018

(54) COUNT TRACKING IN DISTRIBUTED ENVIRONMENTS

(75) Inventors: Zhenming Liu, Cambridge, MA (US); Bozidar Radunovic, Cambridge (GB); Milan Vojnovic, Cambirdge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1101 days.

(21) Appl. No.: 13/420,612

(22) Filed: Mar. 15, 2012

(65) Prior Publication Data

US 2013/0246608 A1    Sep. 19, 2013

(51) Int. Cl.
*G06F 15/173* (2006.01)
*H04L 12/26* (2006.01)
*H04L 12/24* (2006.01)

(52) U.S. Cl.
CPC .......... *H04L 43/024* (2013.01); *H04L 41/069* (2013.01); *H04L 43/026* (2013.01); *H04L 43/028* (2013.01)

(58) Field of Classification Search
CPC ...... H04B 3/23; H04B 10/2581; G06N 3/086; G06N 3/126; G06Q 40/08; G06Q 40/00; G06Q 10/06375; H04M 15/80; H04L 12/2801; H04L 41/046; H04L 43/024; H04L 41/069; H04L 43/026; H04L 43/028; H04W 88/06; H04W 48/18; H04W 60/04; H04J 14/0212; H04J 14/0257; H04N 19/12; H04Q 11/0005; H04Q 2011/0016; H04Q 2011/0039; G06F 11/3476
USPC ........................................................ 709/224
See application file for complete search history.

(56) References Cited

U.S. PATENT DOCUMENTS

| | | | | |
|---|---|---|---|---|
| 4,677,614 A | * | 6/1987 | Circo | H04J 3/0641 370/222 |
| 5,950,185 A | * | 9/1999 | Alon et al. | 707/758 |
| 6,199,082 B1 | | 3/2001 | Ferrel et al. | |
| 6,996,624 B1 | * | 2/2006 | LeCroy | H04L 29/06027 370/231 |

(Continued)

OTHER PUBLICATIONS

Keralapura, et al., "Communication-Efficient Distributed Monitoring of Thresholded Counts", in Proceedings of the ACM SIGMOD International Conference on Management of Data, Jun. 27, 2006, pp. 289-300.

(Continued)

*Primary Examiner* — Ryan Jakovac

(57) ABSTRACT

Count tracking in distributed environments is described, for example, as in data centers where many sites receive data and a coordinator node estimates a sum of the data received across the sites. Count tracking may be used in database applications, search engines, social networking applications and others. In various embodiments sites and a coordinator node work together to implement a process for summing data received at sites, where the sum takes into account both increments and decrements. In examples, a site decides whether to notify the coordinator node of a new data item according to a sampling probability that is related to an estimate of the current global sum of the data input across sites. In some examples a multi-mode algorithm is implemented which increases or decreases communication between the sites and the coordinator node according to behavior of the estimated global sum such that communications costs are optimized.

20 Claims, 10 Drawing Sheets

(56) References Cited

U.S. PATENT DOCUMENTS

| | | | |
|---|---|---|---|
| 2003/0007507 A1* | 1/2003 | Rajwan | H04L 1/007 370/468 |
| 2004/0199659 A1* | 10/2004 | Ishikawa | H04L 1/0002 709/235 |
| 2005/0162298 A1* | 7/2005 | Kuzumoto | H04N 7/0355 341/155 |
| 2005/0239498 A1* | 10/2005 | Dorenbosch | H04W 76/02 455/552.1 |
| 2005/0282579 A1* | 12/2005 | Kim | H04W 48/18 455/552.1 |
| 2007/0286071 A1* | 12/2007 | Cormode et al. | 370/229 |
| 2008/0040471 A1 | 2/2008 | Birkestrand et al. | |
| 2009/0031175 A1* | 1/2009 | Aggarwal et al. | 714/47 |
| 2010/0079339 A1* | 4/2010 | Yoon et al. | 342/357.12 |
| 2010/0242061 A1* | 9/2010 | Levitan | 725/19 |
| 2010/0296466 A1* | 11/2010 | Mignot et al. | 370/329 |
| 2010/0312872 A1 | 12/2010 | Cormode et al. | |
| 2011/0307601 A1* | 12/2011 | Hogan et al. | 709/224 |

OTHER PUBLICATIONS

Manku, et al., "Approximate Frequency Counts over Data Streams", in Proceedings of the 28th International Conference on Very Large Data Bases, Aug. 20, 2002, pp. 346-357.

Lin, et al., "Aggregate Computation over Data Streams", in Proceedings of the 10th Asia-Pacific Web Conference on Progress in WWW Research and Development, Apr. 26, 2008, pp. 10-25.

Cormode, et al., "What's Different: Distributed, Continuous Monitoring of Duplicate-Resilient Aggregates on Data Streams", in Proceedings of the 22nd International Conference on Data Engineering, Apr. 3, 2006, pp. 20-31.

Thereska, et al., "Stardust: Tracking Activity in a Distributed Storage System", in Proceedings of the Joint International Conference on Measurement and Modeling of Computer Systems, vol. 34, No. 1, Jun. 26, 2006, pp. 3-14.

Alon, et al., "The space complexity of approximating the frequency moments", Feb. 2002.

Arackaparambil, et al., "Functional monitoring without monotonicity", in Proc. of ICALP, 2009.

Cormode, et al., "Sketching streams through the net: Distributed approximate query tracking", in Proc. of International Conference on Very Large Databases, 2005.

Cormode, et al., "Holistic aggregates in a networked world: Distributed tracking of approximate quantiles", in Proc. of SIGMOD, Jun. 2005.

Cormode, et al., "Algorithms for distributed functional monitoring", in Proc. of SODA, 2008.

Cormode, et al., "What's different: Distributed, continuos monitoring of duplicate-resilient aggregates on data streams", in Proc. IEEE International Conference on Data Engineering, 2006.

Cormode, et al., "Optimal sampling from distributed streams", in Proc. of PODS, Jun. 2010.

Greenwald, et al., "Space-efficient online computation of quantile summaries", in Proc. of SIGMOD, pp. 58-66, 2001.

Greenwald, et al., "Power-conserving computation of order-statistics over sensor networks", in Proc. of PODS, 2004.

Huang, et al., "Randomized algorithms for tracking distributed count, frequencies, and ranks", in arXiv: 1108.3413v2, Dec. 2011.

Olston, et al., "Adaptive filters for continuos queries over distributed data streams", in Proc. ACM SIGMOD International Conference on Management of Data, 2003.

Trithapura, et al., "Optimal random sampling from distributed streams revisited", in Proc. of DISC, Roma, Italy, Sep. 2011.

Yi, et al., "Optimal tracking of distributed heavy hitters and quantiles", in Proc. of PODS, Jun. 2009.

Liu, et al., "Continous distributed counting for non-monotonous streams", MSR-TR-2011-128, 2011.

Vojnovic, "Continuous distributed counting for non-monotomic streams", Slides presented at NII Shonan meeting, Jan. 2012.

\* cited by examiner

COUNT TRACKING IN DISTRIBUTED ENVIRONMENTS

BACKGROUND

Count tracking involves monitoring how many events or items occur for example, as real time streams of data arrive at entities or as pre-stored data is accessed by entities. For very large scale situations in distributed environments this becomes a difficult task because of the huge number of events or items to be counted and because of the need for communication between the entities in the distributed environment.

Count tracking is useful in many application domains. For example counting user's votes in a social networking environment, counting packets in a packet-based communications network to monitor traffic flow, counting data arriving at computing entities in a data center, counting queries arriving at a search engine, database applications and others. Often it is required to track a difference using count tracking technology. For example to track which of two candidates has a higher number of votes and by what voting margin.

Count tracking technology seeks to provide accurate counts whilst at the same time trying to reduce the amount of communication needed between entities in a distributed environment where the events or data that are being counted are observed.

The embodiments described below are not limited to implementations which solve any or all of the disadvantages of known count tracking technology.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Count tracking in distributed environments is described, for example, as in data centers where many sites receive data and a coordinator node estimates a sum of the data received across the sites. Count tracking may be used in database applications, search engines, social networking applications and others. In various embodiments sites and a coordinator node work together to implement a process for summing data received at sites, where the sum takes into account both increments and decrements. In examples, a site decides whether to notify the coordinator node of a new data item according to a sampling probability that is related to an estimate of the current global sum of the data input across sites. In some examples a multi-mode algorithm is implemented which increases or decreases communication between the sites and the coordinator node according to behavior of the estimated global sum such that communications costs are optimized.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although many of the present examples are described and illustrated herein as being implemented in a data center, the system described is provided as an example and not a limitation. As those skilled in the art will appreciate, the present examples are suitable for application in a variety of different types of count tracking systems.

Figure 1:
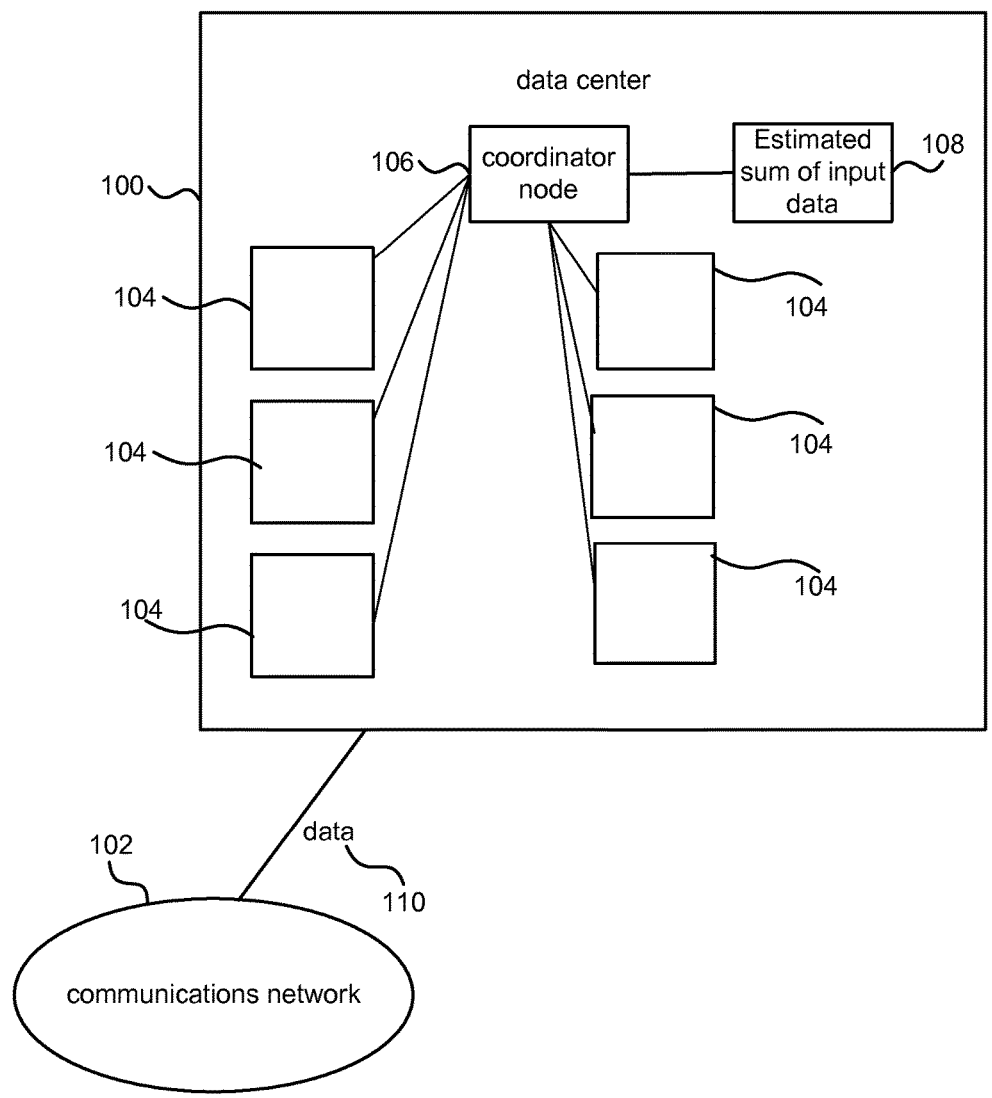
FIG. 1 is a schematic diagram of a data center having a count tracking system.

FIG. 1 is a schematic diagram of a data center 100 having a count tracking system comprising a coordinator node 106 and a plurality of count tracking engines each at a site 104. The data center 100 comprises a plurality of computing entities referred to here as sites 104 each of which receives data. In the example illustrated the sites 104 are physically close to one another at the data center 100 but that is not essential. The sites may be remote from one another and they may be remote from the coordinator node. In the example illustrated there only six sites 104 are shown for clarity but in practice there may be many more sites. Each site comprises a count tracking engine. The count tracking engines and the coordinator node 106 work together to calculate an approximate count of data that is input to the sites. The coordinator node 106 is able to output an approximate sum 108 of the input data across all the sites. The sum may be non-monotonic which means that both increments and decrements to the sum are possible. The counting process implemented by the count tracking engines and the coordinator node 106 may be arranged so that the amount of communication between the sites 104 and the coordinator node 106 is reduced whilst the approximate sum 108 across all the sites is accurate within a known error tolerance. For example, to compute an exact sum of all the data items across the sites, each site could tell the coordinator node a data item every time it received one. This would require a prohibitively large communication cost which is linear in the size of the input stream. To reduce the communication cost the sites may report only some of the data items to the coordinator node. By selecting when to report the data items the communication cost is reduced whilst keeping the accuracy of the estimated sum within a specified tolerance. For example, the sites may be arranged to make the selection on the basis of the current estimated sum across sites. In examples the sites may be arranged to make the selection using criteria that differ over time.

The coordinator node 106 is computer-implemented and is in communication with each of the sites either by a physical connection or by a wireless connection or in any other way. Other components may be present at the data center in order to enable the data center to perform large computing tasks by distributing the work between the sites and aggregating the results. These other components are not shown for clarity.

The data center may be connected to a communications network 102 in order that data 110 may be input or output from the data center. This is not essential however, data may be input and output from the data center in other ways and in some examples data may be stored at the data center itself.

Each site has a count tracking engine which monitors data input to the site. For example, each site has a stream of data arriving at that site. The stream to each site may be a single real time stream distributed between the sites because of the scale of data involved. In another example, stored data may be available in the communications network 102 and may be accessed by the sites so creating a stream of data arriving at each site. In some examples where the input streams are random the reduction in communication cost is particularly good as compared with reporting all the data items to the coordinator node and the accuracy of the estimated sum is high.

Figure 2:
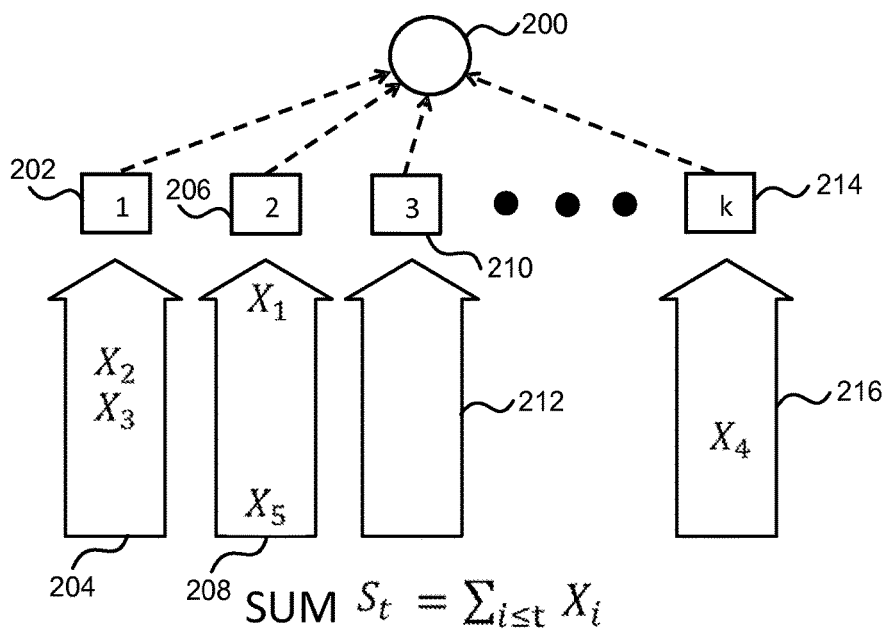
FIG. 2 is a schematic diagram of a count tracking system comprising a coordinator node and k sites.

FIG. 2 is a schematic diagram of a count tracking system comprising a coordinator node 200 and k sites 202, 206, 210, 214. Only four sites are illustrated but many more may be used in practice as indicated by the black dots in FIG. 2. Each site receives a stream of data. For example, site 1 receives data stream 204 comprising data items X2 and X3; site 2 receives data stream 208 comprising data items X1 and X5; site 3 receives data stream 212 which at present has no data items; site k receives data stream 216 which comprises data item X4. The input data items X1, X2, X3, X4, X5 may be assigned to the sites in an arbitrary manner and the values of data items may arrive in a temporal order, for example, according to a random permutation, according to a sequence of independent and identically distributed random variables, according to a fractional Brownian random process, according to a random input stream having a temporal long-range dependency, or in other substantially random manners. However, this is not essential, the input data items may be assigned to the sites in ways which are not random. Note that the assignment of data items to the sites is allowed to be in an arbitrary way. Also, times between arrivals of any two consecutive data items may be arbitrary, and unknown to the coordinator node.

FIG. 2 illustrates a coordinator node 200 which tracks an estimated sum of the input data items (the Xs) over time t and across all the sites. This estimated sum is represented by the symbol $\hat{S}t$. The coordinator node 200 tracks the estimated sum within a specified error tolerance of the actual sum. The specified error tolerance is represented by the Greek epsilon character "ε". The error tolerance is a user configurable parameter that may be set by the user operating a graphical user interface or in any other manner. Each site is able to track its local sum (the sum of data items it receives from its stream) and is able to communicate with the coordinator node 200 as indicated by the dotted lines in FIG. 2. The sum estimated by the coordinator node is a sum across the sites and may be referred to as a global sum of the input data items. The global sum and the local sums may be non-monotonic which means that they track both increments and decrements. As a result the global sum may fluctuate by going up or down over time.

Figure 3:
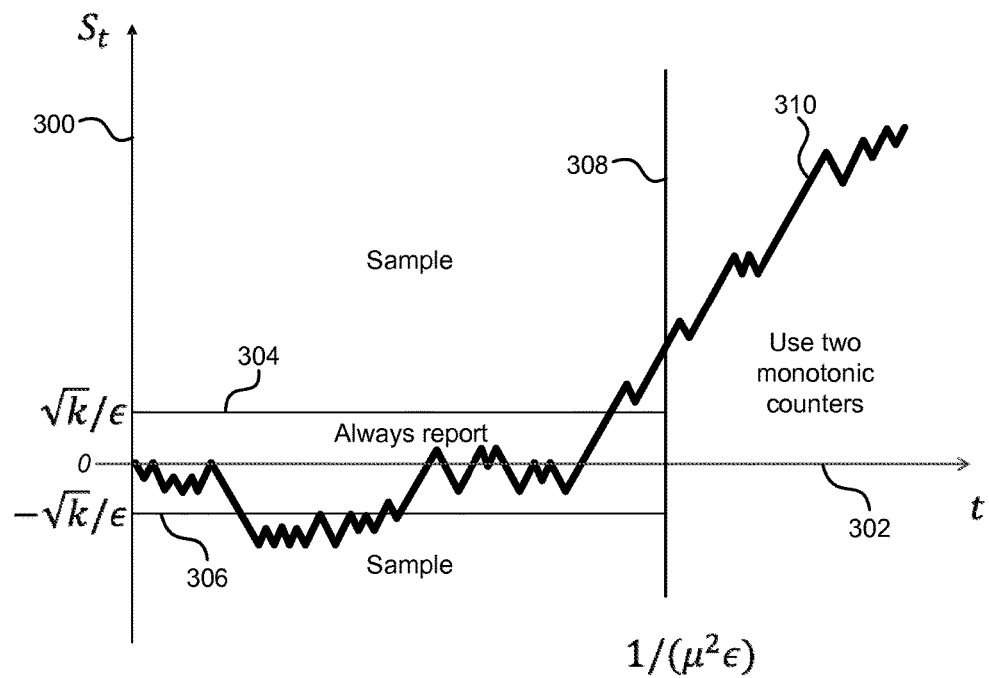
FIG. 3 is a graph of a sum tracked by a count tracking system over time.

FIG. 3 is a graph of a sum tracked by a count tracking system over time. The magnitude of the actual global sum is represented on axis 300 by symbol St and the time t is represented on axis 302. The time t is related to the number of data items that have arrived at the sites assuming that data items arrive at regular time intervals. In the example of FIG. 3 the global sum is plotted as line 310 and it initially fluctuates around or below zero before increasing. This is one example of global sum behavior and many others are possible according to the particular data streams at the sites.

It is recognized herein that when the global sum is close to zero accuracy of the global sum estimate is significantly affected by new data items arriving at the sites. However, this is not the case when the global sum is further away from zero. It is also recognized that when the global sum exhibits a drift it is possible to use monotonic counting processes which take into account increments but not decrements to the estimate of the global sum. A drift in the global sum is a general rate of change of the global sum which is approximately constant. When there is a drift and the general rate of change of the global sum is approximately constant it is recognized herein that it is possible to use monotonic counting processes. This is because any changes in the global sum are likely to be smaller than the change introduced by the drift.

In various embodiments a multi-mode algorithm may be used which takes into account the behavior of the global sum estimate in order to reduce communications costs whilst maintaining accuracy of the global sum estimate within a specified error tolerance. For example, a multi-mode algorithm may comprise an "always report" mode, a "sample" mode and a monotonic mode in which two monotonic counters are used. In another example, a multi-mode algorithm comprises only an "always report" mode and a "sample" mode. It is also possible to use only the "sample" mode; this provides a workable solution especially where the application domain is such that the global sum is known to be away from zero or where the accuracy requirements are reduced.

In an example, a count tracking system with a multi-mode algorithm is arranged so that the sites always report arrival of data items to a coordinator node whilst the global sum estimate is close to zero. This may be referred to as an "always report" mode. In the example of FIG. 3 sites may be arranged to always report arrival of data items to a coordinator node whilst the global sum estimate is in the region bounded by lines 304, 306, 308 and the axis 300. In an example, the global sum estimate is close to zero when it is within a specified range of zero. The specified range may be related to the specified error tolerance represented by the Greek epsilon character "ε" and also to the number of sites k. In the example shown in FIG. 3 the specified range is related to the square root of the number of sites divided by the specified error tolerance.

During a sample mode the sites do not always report arrival of data items to a coordinator node. In this case the sites use a selection process to decide whether or not to notify the coordinator node when a new data item arrives at the site. The selection process may take into account the current estimate of the global sum. FIG. 3 gives two example regions in the graph where the sample mode may be used. During the sample mode a non-monotonic count tracking process may be used as described in more detail below.

During a monotonic mode two monotonic counters may be implemented using any known monotonic counting process; one to track positive updates to the estimated global sum and one to track negative updates to the estimated global sum. The difference between the positive updates and the negative updates is then available. A monotonic mode may be entered when the counting system identifies a drift in the estimated global sum. For example, FIG. 3 shows a region in the graph when two monotonic counters may be used as the estimated global sum 310 is showing a positive drift. The symbol μ may be used to represent drift. In the example of FIG. 3 the monotonic mode is entered when the time t (also referred to the total number of data items received so far) is greater than 1 divided by the square of the drift multiplied by the specified error tolerance.

A coordinator node may be used to control which mode of a multi-mode algorithm is operational. For example, with reference to FIG. 4 a method at a coordinator node to control modes of a count tracking system is described. The coordinator node broadcasts 400 to the sites a message instructing them to use an always report mode. The coordinator node monitors the estimated global sum and if that moves away from zero 402 the coordinator node broadcasts 404 a message to the sites. The message instructs the sites to use a sampling mode during which a non-monotonic counting process is implemented. The coordinator node monitors the estimated global sum and checks 406 whether the sum moves close to zero. If so, the coordinator node moves to step 400 and broadcasts a message to the sites instructing them to use the always report mode. If not, the coordinator node checks 408 whether a drift is present. If so, the coordinator node broadcasts a message to the sites instructing them to enter a monotonic mode. If not, the coordinator node monitors the estimated global sum and checks whether it has moved close to zero.

Figure 4:
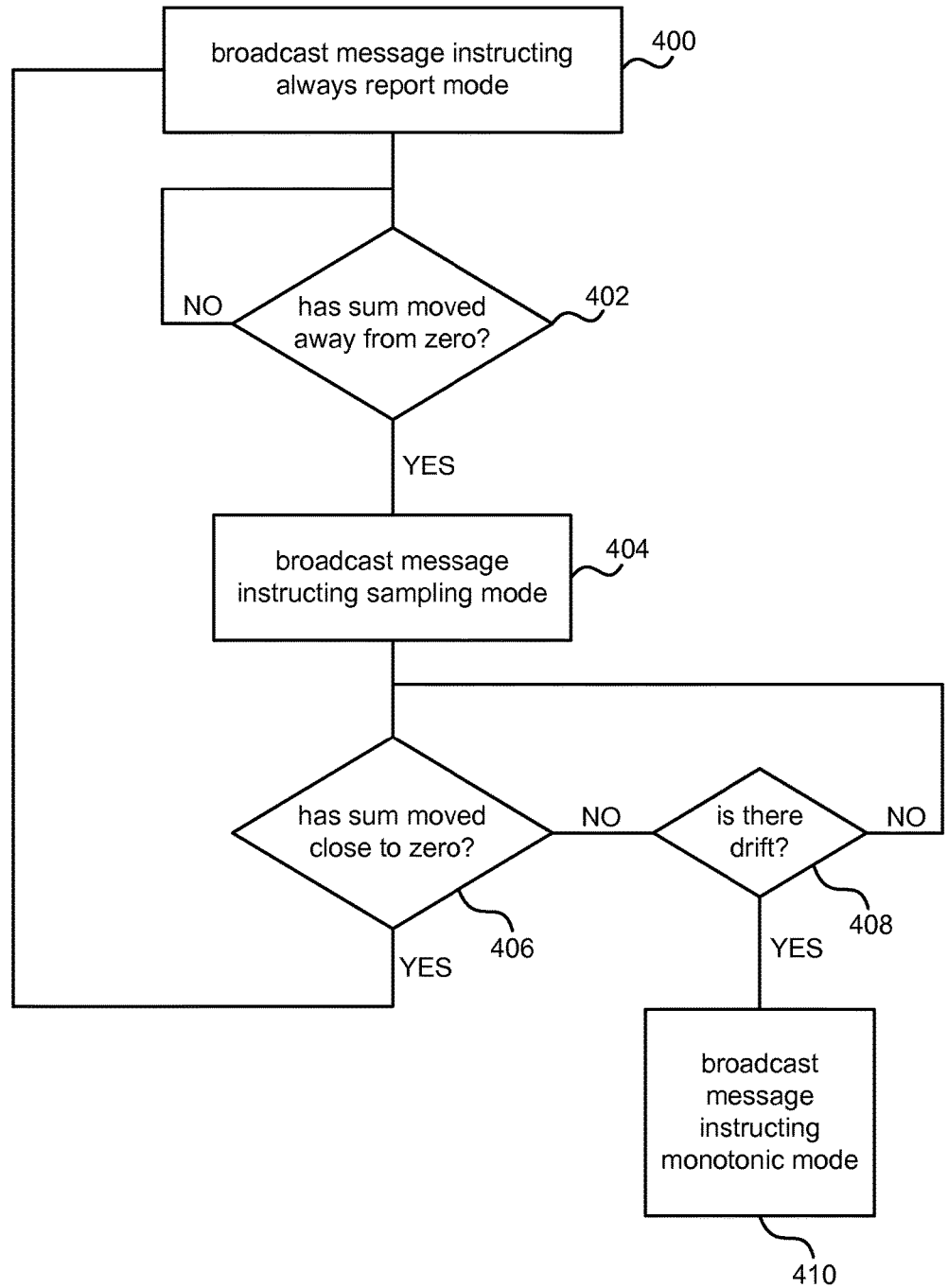
FIG. 4 is a flow diagram of a method at a coordinator node to control modes of a count tracking system.

In the case that the monotonic mode is not used the process of FIG. 4 may be modified by removing check 408 and message broadcast step 410.

Figure 5:
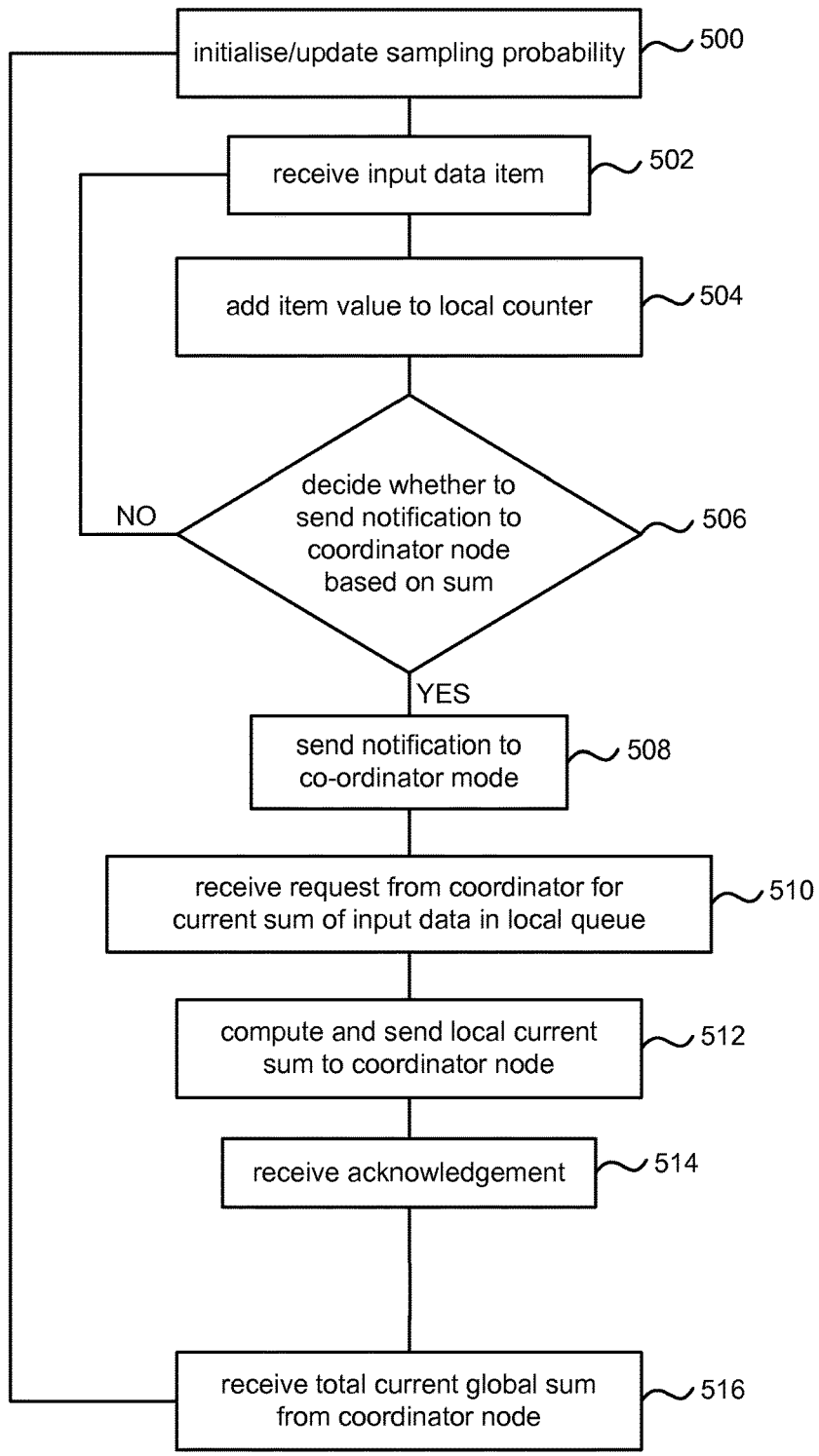
FIG. 5 is a flow diagram of a method at a site during a non-monotonic mode of a count tracking process.
Figure 6:
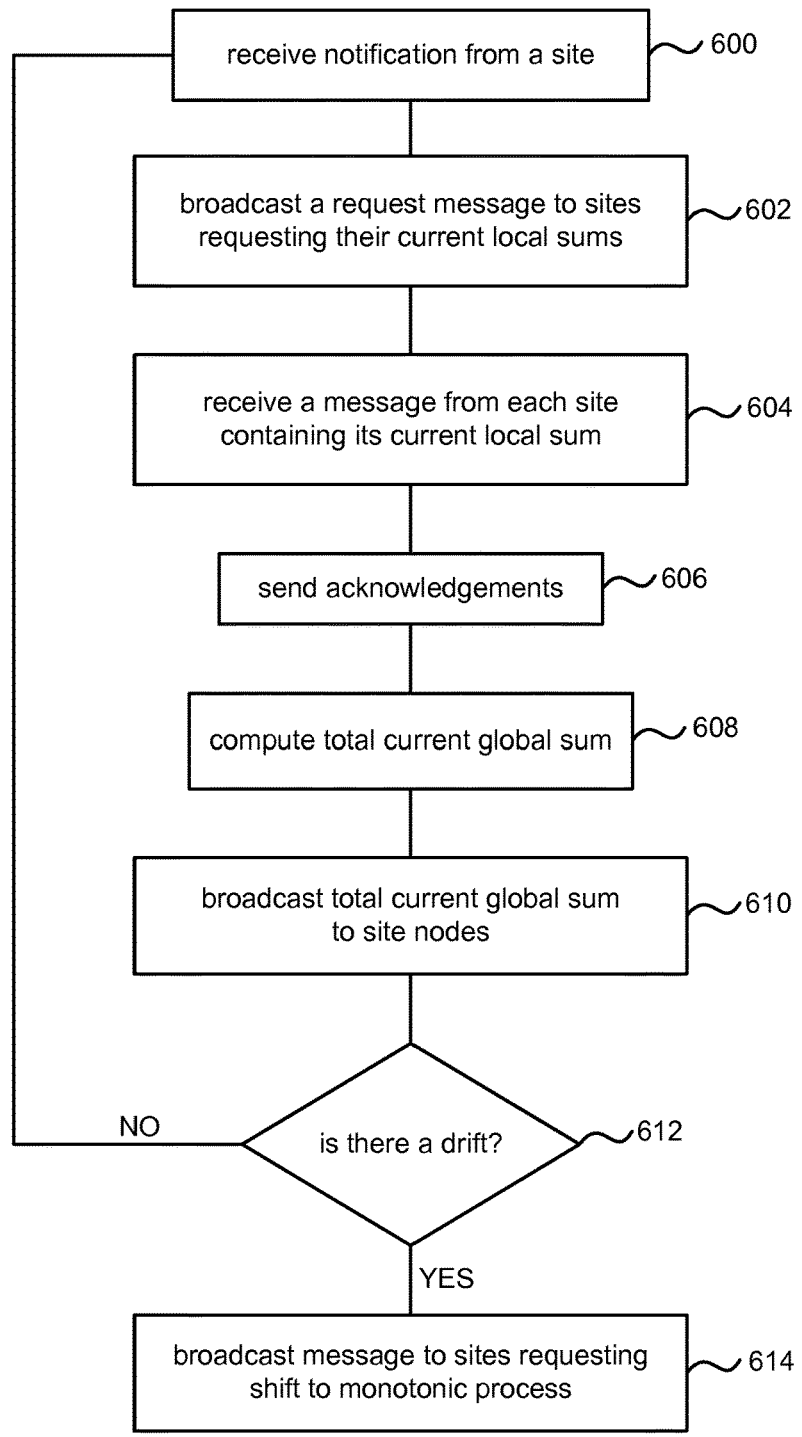
FIG. 6 is a flow diagram of a method at a coordinator node during a non-monotonic mode of a count tracking process.

More detail about an example process for use during a sampling mode for non-monotonic counting is now given with respect to FIGS. 5 and 6. FIG. 5 gives an example process at a site which may occur at each of the sites. FIG. 6 gives an example process at a coordinator node.

With respect to FIG. 5 a site initializes or updates 500 a sampling probability. For example, at the start of the sampling mode each site may receive the current global sum estimate from the coordinator node and may use this to calculate a sampling probability. In an example the sampling probability may be approximately equal to 1 divided by the square of the specified error tolerance multiplied by the square of the current global sum estimate. Thus the sampling probability may be related to the current global sum estimate and the specified error tolerance.

The site receives an input data item 502 and adds 504 the data item to a local counter at the site. The site decides 506 whether to send a notification to the coordinator node. This decision may be made by using the sampling probability to sample a Bernoulli random variable. This process may be thought of as making a coin flip to make a "yes/no" decision where the coin is biased according to the sampling probability. If the result of the decision is "yes" the site sends 508 a notification message to the coordinator node. The site receives 510 a request from the coordinator node asking for the current sum of the input data in the local queue. The site computes 512 and sends the local current sum to the coordinator node. The site optionally receives 514 an acknowledgement from the coordinator node and empties the local counter 516. Meanwhile the coordinator node updates the estimate of the current global sum using the new data it has from the sites and informs the sites. The site receives 518 the current global sum estimate from the coordinator node.

With respect to FIG. 6 the coordinator node receives 600 a notification from a site node. For example, the notification is sent by a site during step 508 of FIG. 5. The coordinator node broadcasts 602 to the sites a request message requesting current local sums of the sites. The coordinator node receives 604 a message from each site containing its current local sum and optionally sends 606 acknowledgements to the sites. The coordinator node uses the current local sums to compute 608 the total current global sum by adding the current local sums and the previous global sum estimate. It broadcasts 610 the total current global sum to the site nodes. The coordinator node optionally checks 612 if a drift is present in the global sum values it has computed. An example process for checking if a drift is present is described in detail below. If a drift is detected the coordinator node broadcasts 614 a message to the sites requesting a shift to a monotonic process. If no drift is detected the coordinator node monitors for notifications from site nodes (i.e. it returns to step 600).

Figure 7:
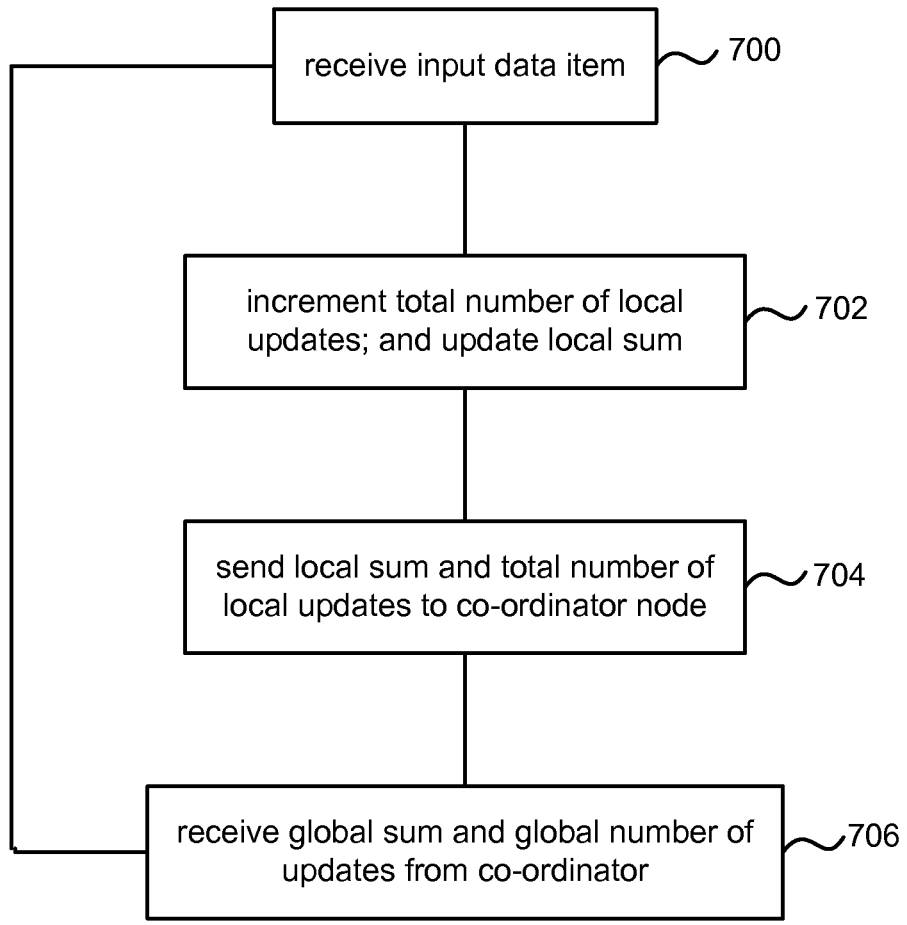
FIG. 7 is a flow diagram of a method at a site during an "always report" mode of a count tracking process.
Figure 8:
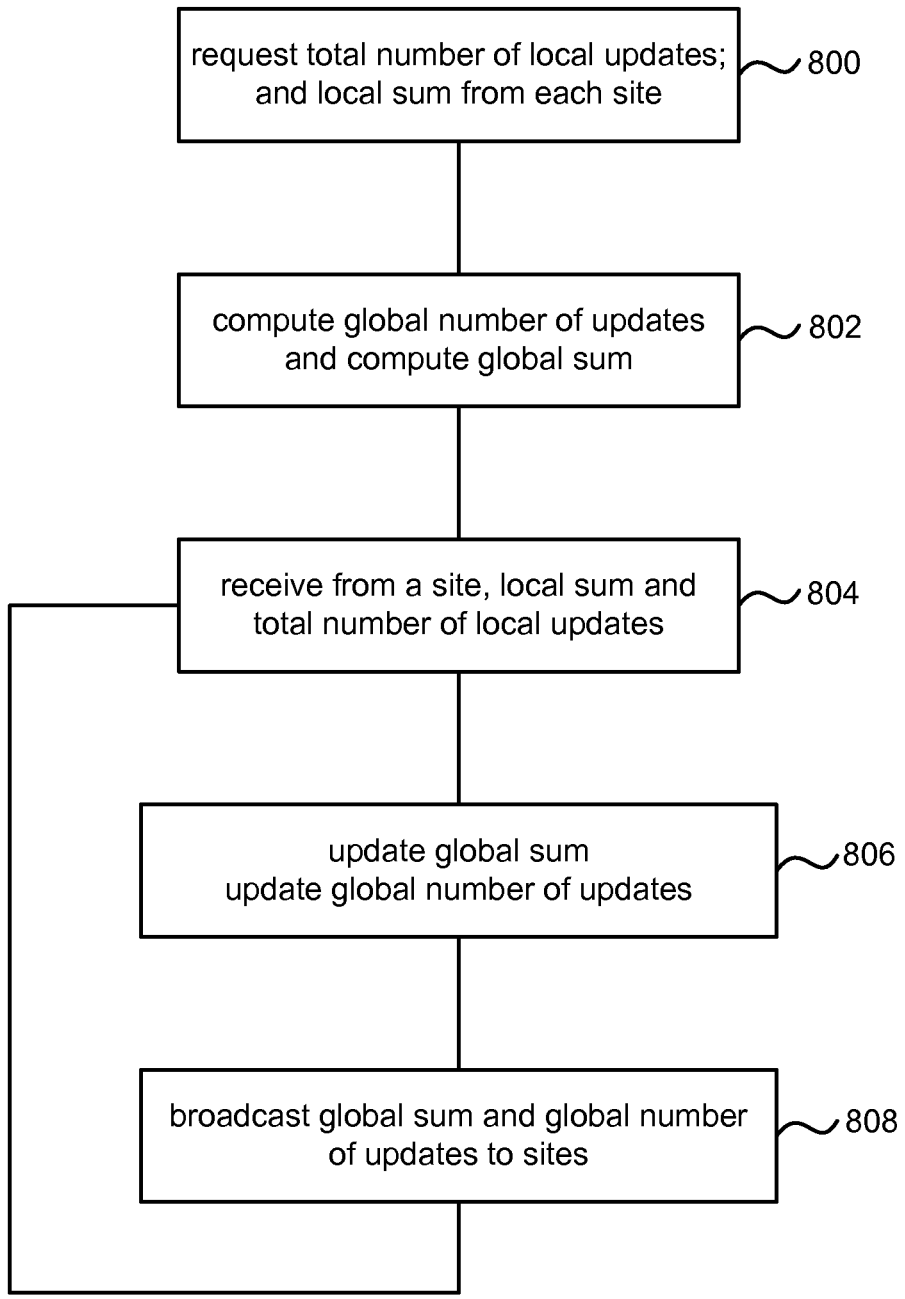
FIG. 8 is a flow diagram of a method at a coordinator node during an "always report" mode of a count tracking process.

More detail about an example process for use during an always report mode for non-monotonic counting is now given with respect to FIGS. 7 and 8. FIG. 7 gives an example process at a site which may occur at each of the sites. FIG. 8 gives an example process at a coordinator node.

With respect to FIG. 7 a site receives an input data item 700 and increments 702 a total number of local updates (i.e. data items received). It also updates a local sum of the input data items. The site sends 704 the local sum and the total number of local updates to the coordinator node. It receives 706 a global sum and a global number of updates from the coordinator. The process returns to step 700 to receive the next input data item. Note that the coordinator may not be aware of times when data items arrive at the sites (i.e. when the updates happen). As mentioned above, the updates may happen at arbitrary intervals, which the coordinator is not aware of. Thus the coordinator cannot assume that global time is in any way related to the global update counter, and it has to learn the counter from the sites in a distributed way, using minimum possible communication. One way to do that is to use a separate, monotonic counter, for the number of updates. This may be implemented by communicating the global number of updates back and forth in an efficient way using a separate monotonic counter.

With reference to FIG. 8 the coordinator node requests 800 a total number of local updates and a local sum from each site. Using the requested information it computes 802 a global number of updates and a global sum. The coordinator node receives 804, from a site, a local sum and a total number of local updates. The coordinator node updates 806 the global sum and updates the global number of updates. The coordinator node broadcasts 808 the global sum and the global number of updates to the sites. The process may return to step 804.

Figure 9:
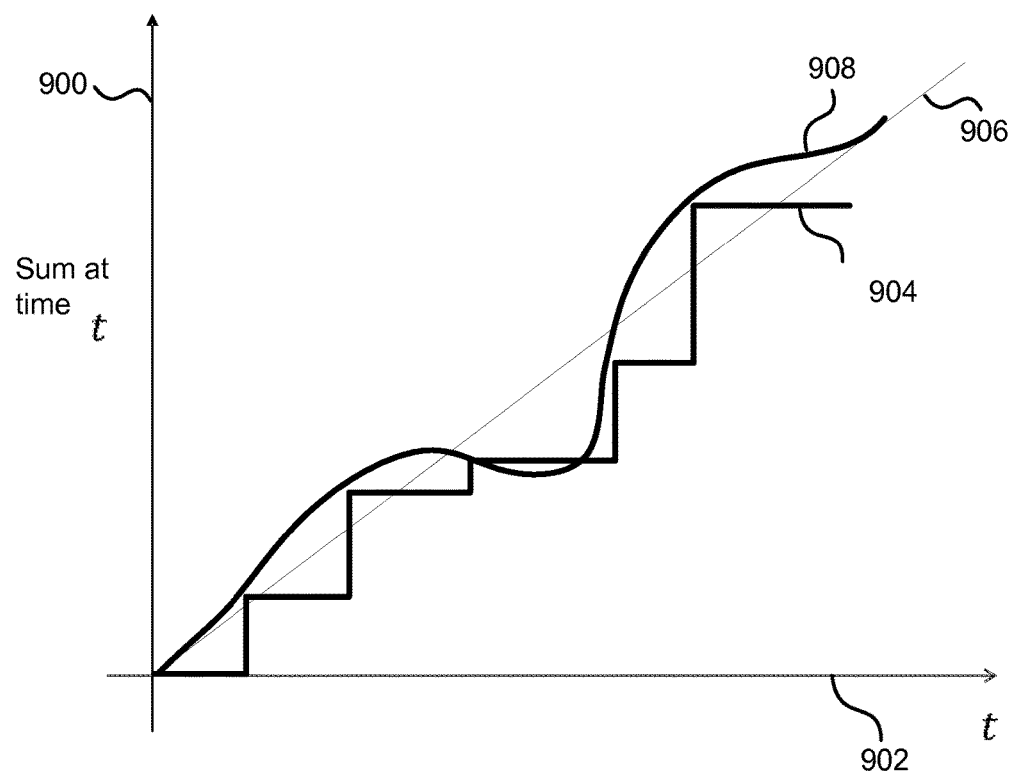
FIG. 9 is a schematic graph of a sum tracked by a count tracking system over time and showing a drift of the sum.

As mentioned above, the coordinator node optionally checks 612 if a drift is present in the global sum values it has computed. FIG. 9 is a graph of global sum magnitude 900 against time 902. The global sum in this example is plotted as curve 908 and stepped line 904 represents five estimates of the global sum at different times. In this example the global sum has a drift represented by line 906. A drift in the global sum is a general rate of change of the global sum which is approximately constant. An example process for checking if a drift is present is described in detail below.

A geometric progression search may be used to estimate drift of the global sum. A geometric progression sequence is specified which is a sequence of numbers where each term after the first is found by multiplying the previous one by a fixed non-zero number called the common ratio. An example of a geometric progression sequence is 2, 6, 18, 54 where the common ratio is 3. An example geometric progression search for the drift $|\mu|$ of the global sum can be described as follows. For a given parameter $0<\varepsilon<1$, the coordinator chooses a geometric sequence $l_i=(1-\varepsilon)^i$ for $i=0, 1, 2, \ldots$, and then at times at which the global number of updates $t=\lceil\log(n)/l_i^2\rceil$, it checks whether $|\mu|>l_i$ by using the unbiased estimator of $\mu$ where this estimator is equal to the ratio of the current global sum and the total number of updates. The symbol n represents the number of data items in the input stream. At the first occurrence at which the latter condition is true, it uses the observed empirical estimate as the estimate of the drift $\mu$.

As mentioned above, the input data items X1, X2, X3, X4, X5 (also referred to as updates) may be assigned to the sites in a random manner, for example, according to a random permutation, according to a random independent and identically distributed process, according to a random input stream exhibiting fractional Brownian motion, according to a random input stream having a temporal long-range dependency, or in other substantially random manners. In the cases where the order of the data items at the input streams is random as mentioned above, it is found that the processes described herein enable the count to be tracked particularly accurately with a high probability and where the communication cost is of the order of the minimum of:

the square root of the number of sites divided by the modulus of the drift times the specified error tolerance; and the square root of the number of sites times the input stream length, divided by the error tolerance parameter; and the input stream length.

This gives a significant improvement in communication costs over the situation where an exact count is tracked by reporting every new update received. For example, a number of social networking short messages generated per day may be more than $10^8$. The processes described herein may be used to track a single counter for such messages using only $10^4$ messages per day which is a significant reduction in traffic load. This also gives a significant improvement in communications costs over known monotonic count processes where only increments to the count are allowed. The fact that the improvements are found where the input streams exhibit fractional Brownian motion is useful where real-world phenomena are to be tracked because many real-world phenomena which have self-similarity and long-range dependencies such as network traffic are often modeled by random processes such as fraction al Brownian motion.

In examples the processes described herein may be used to track a second frequency moment. In other examples the processes described herein may be used to implement an update process for Bayesian linear regression. The second frequency moment is a statistic that can be described as follows. Consider a stream of data items that take values on a finite set of distinct values, e.g. this could be categories like various shopping items or product brands. The second frequency moment of this stream of data items is defined as the sum of the squared number of occurrences of individual distinct data values. The count tracking methods described herein may be used to track the second frequency moment of a stream of data items.

Linear regression is a statistical model that is used to describe the relationship between a set of feature vectors and the corresponding observed output or label associated to each feature vector, e.g. the feature vector may be a real-valued vector that represents the profile of a user of a search engine, and the output may correspond to the observation whether this given user has clicked on an ad displayed to the user while presented with search results. Bayesian linear regression refers to linear regression considered in a Bayesian framework where the parameters of the model are assumed to be random variables, one assumes a prior distribution on these random variables, and then computes their posterior distributions as the data is observed according to a Bayesian approach. The count tracking methods described herein may be used to track the posterior inverse of the covariance matrix of the parameters in a Bayesian linear regression, where the prior distribution of the model parameters is assumed to be a Gaussian distribution.

Figure 10:
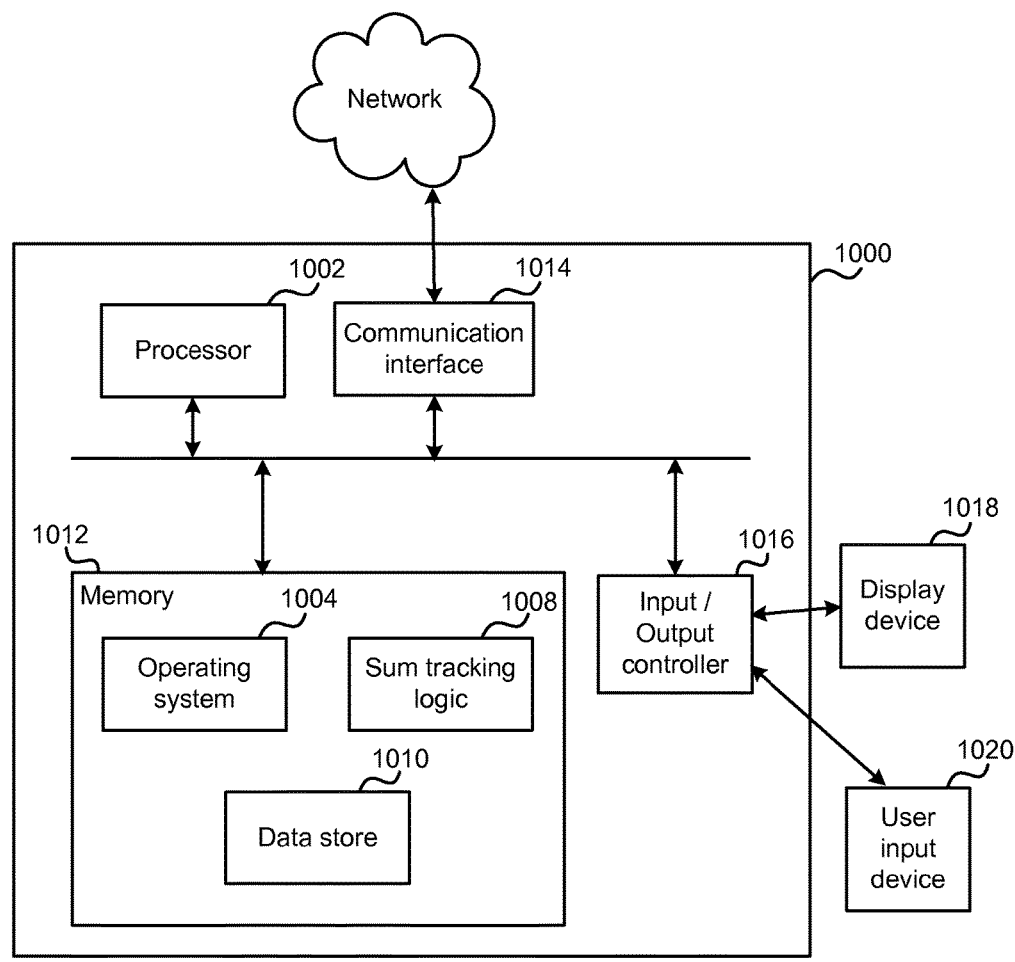
FIG. 10 illustrates an exemplary computing-based device in which embodiments of a coordinator node or a site may be implemented.

FIG. 10 illustrates various components of an exemplary computing-based device 1000 which may be implemented as any form of a computing and/or electronic device, and in which embodiments of a coordinator node or a site may be implemented.

Computing-based device 1000 comprises one or more processors 1002 which may be microprocessors, controllers or any other suitable type of processors for processing computer executable instructions to control the operation of the device in order to provide at least part of a count tracking system. In some examples, for example where a system on a chip architecture is used, the processors 1002 may include one or more fixed function blocks (also referred to as accelerators) which implement a part of the method of count tracking in hardware (rather than software or firmware). Platform software comprising an operating system 1004 or any other suitable platform software may be provided at the computing-based device to enable application software to be executed on the device. A sum tracking logic 1008 may be provided to enable the methods of any of FIGS. 5 to 8 to be implemented. A data store 1010 enables parameters such as an error tolerance to be stored as well as sampling probabilities, input data items, local sums, global sums or other data.

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism.

As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1000 it will be appreciated that the storage may be distributed or located remotely and accessed via a network or other communication link (e.g. using communication interface 1014).

The computing-based device 1000 also comprises an input/output controller 1016 arranged to output display information to a display device 1018 which may be separate from or integral to the computing-based device 1000. The display information may provide a graphical user interface. The input/output controller 1016 is also arranged to receive and process input from one or more devices, such as a user input device 1020 (e.g. a mouse, keyboard, camera, microphone or other sensor). In some examples the user input device 1020 may detect voice input, user gestures or other user actions and may provide a natural user interface. This user input may be used to input an error tolerance parameter or other parameters. In an embodiment the display device 1018 may also act as the user input device 1020 if it is a touch sensitive display device. The input/output controller 1016 may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method at a coordinator node in a distributed environment comprising a plurality of sites arranged to receive data items, each site being in communication with the coordinator node, the method comprising:
   receiving a notification from a site;
   broadcasting a request message to the plurality of sites requesting a current local sum of each site, where the current local sum is a sum of data items received at each site of the plurality of sites;
   receiving a message from each site of the plurality of sites comprising the current local sum of each site of the plurality of sites;
   computing a current estimated global sum using the current local sums from the received messages;
   determining, using at least a multi-mode algorithm, whether to trigger a switch at least between monotonic and non-monotonic modes, the monotonic mode comprising the use of at least two monotonic counters; and broadcasting the current estimated global sum to the sites.

2. A method as claimed in claim 1 wherein computing the current estimated global sum comprises making both increments and decrements.

3. A method as claimed in claim 1 wherein the current local sums and the current estimated global sum are non-monotonic.

4. A method as claimed in claim 1 comprising repeating the method as notifications are received from each site of the plurality of sites, storing the computed current estimated global sums, and checking whether a drift in the current estimated global sum is present where a drift is a general rate of change of the current estimated global sum which is approximately constant.

5. A method as claimed in claim 1 comprising, if a drift is present, broadcasting a message to each site of the plurality of sites requesting a shift to a process where only increments to the current local sums and the current estimated global sums are possible.

6. A method as claimed in claim 1 comprising, if the current estimated global sum is within a specified range of zero, broadcasting a message to each site of the plurality of sites instructing each site of the plurality of sites to send a message to the coordinator node every time a data item is received.

7. A method as claimed in claim 6 wherein the specified range is related to a number of sites and to a user specified error tolerance parameter.

8. A system comprising:
a coordinator node in a distributed environment, wherein the distributed environment comprises a plurality of sites arranged to receive data items, each site being in communication with the coordinator node;
the coordinator node configured to:
receive a notification from a site;
broadcast a request message to each of the plurality of sites requesting the current local sum of each site of the plurality of sites, where a current local sum is a sum of data items received at each site of the plurality of sites;
receive a message from each site of the plurality of sites comprising the current local sum of each site of the plurality of sites;
compute a current estimated global sum using the current local sums from the received messages;
determine, using at least a multi-mode algorithm, whether to trigger a switch at least between monotonic and non-monotonic modes, the monotonic mode comprising the use of at least two monotonic counters; and
broadcast the current estimated global sum to each site of the plurality of sites.

9. A system as claimed in claim 8 wherein the coordinator node is configured to compute the current estimated global sum comprises making both increments and decrements.

10. A system as claimed in claim 8 wherein the current local sums and the current estimated global sum are non-monotonic.

11. A system as claimed in claim 8 wherein the coordinator node is further configured to repeat receiving notifications from sites, storing the computed current estimated global sums, and checking whether a drift in the current estimated global sum is present, where a drift is a general rate of change of the current estimated global sum which is approximately constant.

12. A system as claimed in claim 11 wherein the coordinator node is further configured to, if a drift is present, broadcast a message to the sites requesting a shift to a process where only increments to the current local sum and current estimated global sums are possible.

13. A system as claimed in claim 8 wherein the coordinator node is further configured to, if the current estimated global sum is within a specified range of zero, broadcast a message to the sites instructing them to send a message to the coordinator node every time a data item is received.

14. A system as claimed in claim 13 wherein the specified range is related to a number of sites and to a user specified error tolerance parameter.

15. A computer program product comprising at least one computer-readable storage memory, the computer-readable storage memory comprising a set of instructions, which, when executed by one or more processors, cause an electronic device to at least perform:
receiving a notification from a site by a coordinator node in a distributed environment comprising a plurality of sites arranged to receive data items, each site being in communication with the coordinator node;
broadcasting, by the coordinator node, a request message to each site of the plurality of sites requesting the current local sum of each site, where a current local sum is a sum of data items received at a site;
receiving, by the coordinator node, a message from each site of the plurality of sites comprising the current local sum of each site of plurality of sites;
computing, by the coordinator node, a current estimated global sum using the current local sums from the received messages;
determining, by the coordinator node, using at least a multi-mode algorithm, whether to trigger a switch at least between monotonic and non-monotonic modes, the monotonic mode comprising the use of at least two monotonic counters; and
broadcasting, by the coordinator node, the current estimated global sum to each site of the plurality of sites.

16. The computer program product of claim 15 wherein computing the current estimated global sum comprises making both increments and decrements.

17. The computer program product of claim 15 wherein the current local sums and the current estimated global sum are non-monotonic.

18. The computer program product of claim 15 wherein the set of instructions further cause the electronic device to perform:
repeating receiving notifications from each site of the plurality of sites, storing the computed current estimated global sums, and checking whether a drift in the current estimated global sum is present where a drift is a general rate of change of the current estimated global sum which is approximately constant.

19. The computer program product of claim 18 wherein the set of instructions further cause the electronic device to perform:
if a drift is present, broadcasting a message to the each site of the plurality of sites requesting a shift to a process where only increments to the current local sums and current estimated global sums are possible.

20. The computer program product of claim 19 wherein the set of instructions further cause the electronic device to perform:
if the current estimated global sum is within a specified range of zero, broadcasting a message to each site of the plurality of sites instructing them to send a message to the coordinator node every time a data item is received.

\* \* \* \* \*